No. 660,400. Patented Oct. 23, 1900.
R. J. SMITH.
VALVE.
(Application filed Oct. 16, 1899.)

(No Model.) 3 Sheets—Sheet 1.

No. 660,400. Patented Oct. 23, 1900.
R. J. SMITH.
VALVE.
(Application filed Oct. 16, 1899.)
(No Model.) 3 Sheets—Sheet 2.

No. 660,400. Patented Oct. 23, 1900.
R. J. SMITH.
VALVE.
(Application filed Oct. 16, 1899.)

(No Model.) 3 Sheets—Sheet 3.

UNITED STATES PATENT OFFICE.

RALPH JOHN SMITH, OF SUNDERLAND, ENGLAND.

VALVE.

SPECIFICATION forming part of Letters Patent No. 660,400, dated October 23, 1900.

Application filed October 16, 1899. Serial No. 733,799. (No model.)

*To all whom it may concern:*

Be it known that I, RALPH JOHN SMITH, a subject of the Queen of Great Britain, residing at Pier Engine Works, South Dock, Sunderland, in the county of Durham, England, have invented certain new and useful Improvements in Emergency Stop-Valves for Steam-Boilers, Fluid-Pipes, and the Like, of which the following is a specification.

This invention relates to automatically-closed flap or similar valves located in steam-pipes or other working fluid-passages and designed to be closed in emergencies by the simple release of a catch or holding device.

The object of my invention is to improve emergency-valves of the character or type referred to; and to accomplish this object my invention involves the features of construction and the combination or arrangement of parts hereinafter described and claimed, reference being made to the accompanying drawings, in which—

Figure 1:
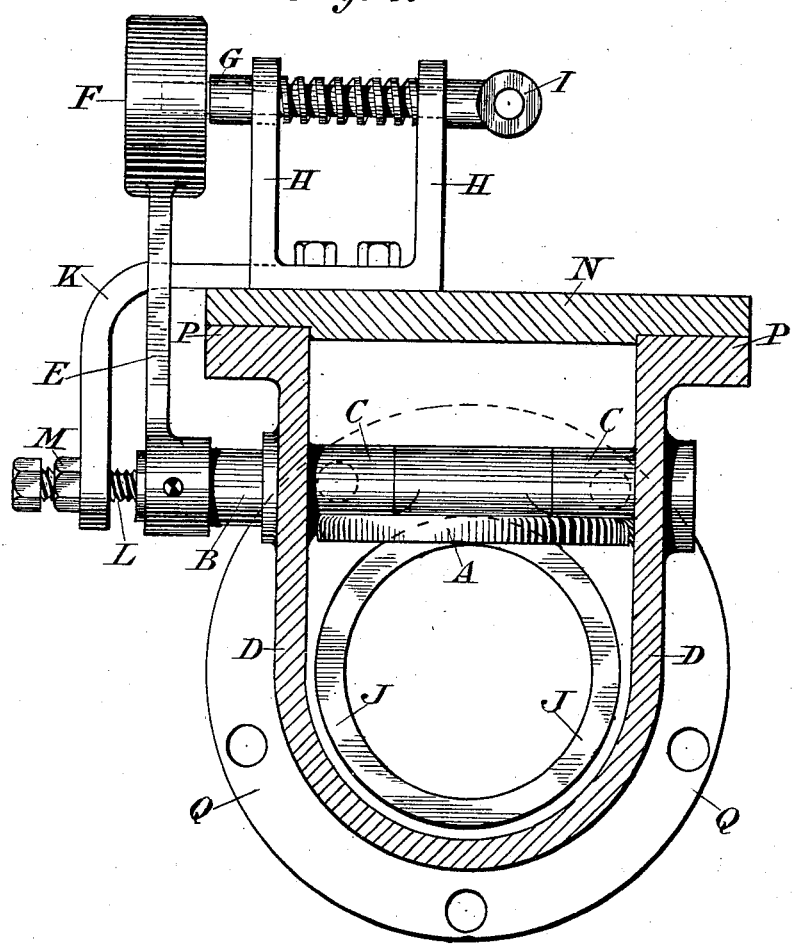
Figure 2:
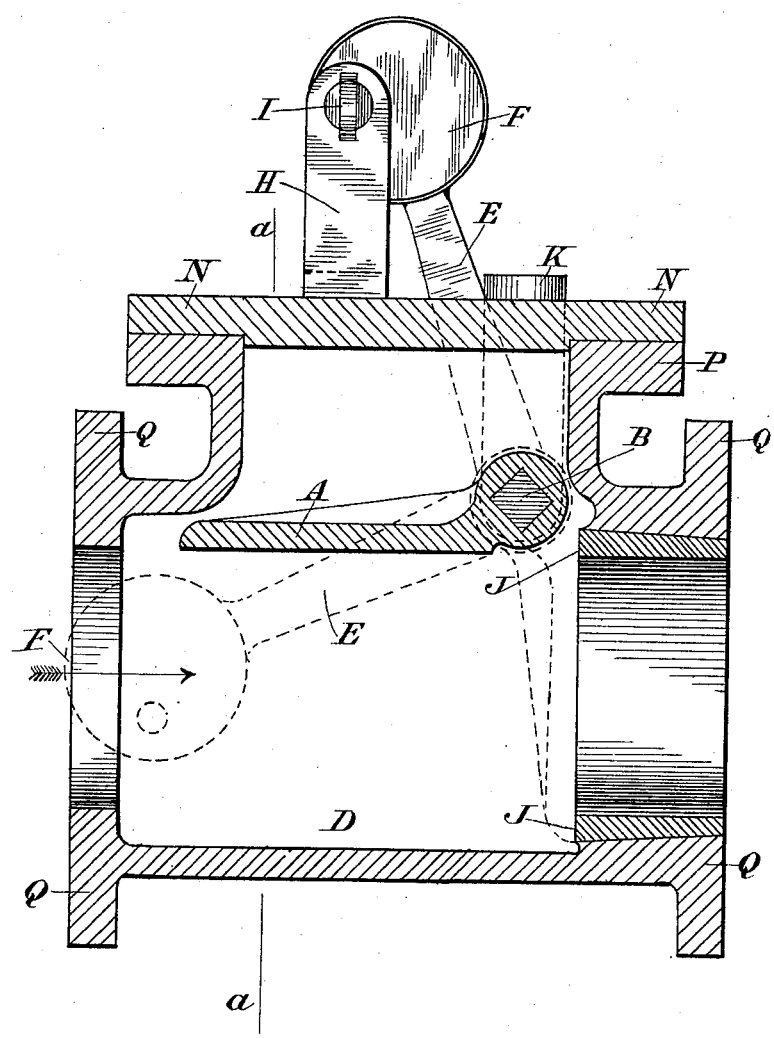
Figure 3:
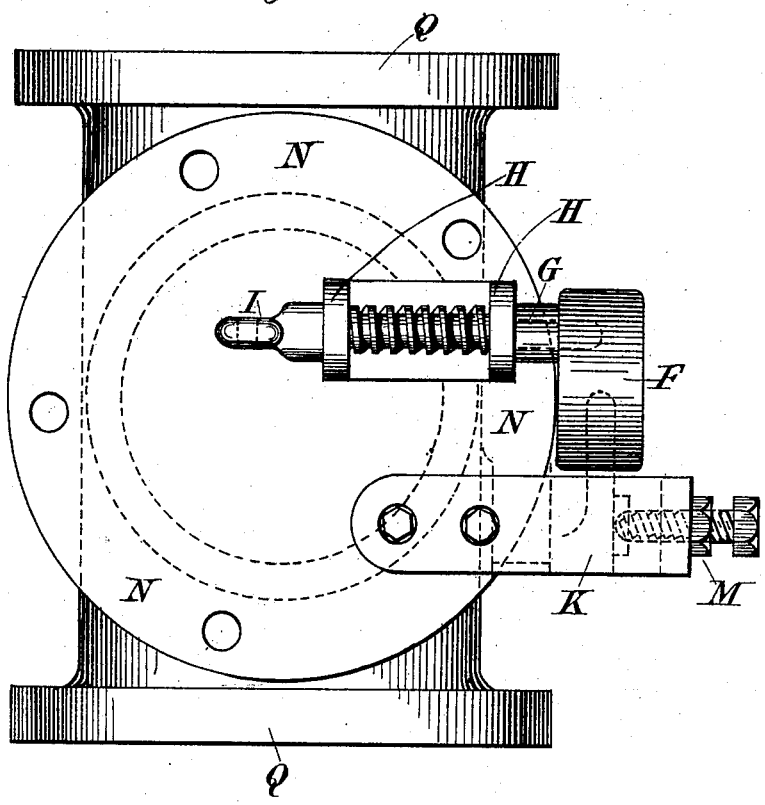

Figure 1 is a sectional elevation through line $a\ a$ of Fig. 2; Fig. 2, a longitudinal section; Fig. 3, a plan of a valve-carrier or connecting length of piping to be fitted to a steam-supply or a fluid-passage pipe for emergency purposes, as before explained.

A is a valve of the flap or clock kind, mounted on, say, a square portion of the axle B, which is carried by the shoulders C C of the short length of pipe D, within which shoulders the axle has free turning motion. The axle extends from outside the pipe D and has affixed to it a weighted lever E, the weight F of which has an orifice, recess, or hole in one face of sufficient depth for retaining the free end of a spring-actioned bolt or catch G in the hole, which bolt is otherwise held by the bracket-cheeks H H. The outer end I of this catch-bolt G is for the connection of a chain or cord which singly or by branch lines can be carried to any distant part for ready action to withdraw the bolt G for the release of the valve A, due to the fall of the weight F, which accelerates and insures the fall and puts the valve A in contact with the seating J, the facing edge of which projects slightly inward for perfect fit.

I purpose using the strap K, with a centralizing and adjustable pivot-screw L, with the fixing-nut M, these being suspended from the cover-plate N of the pipe D, preferably bolted or screwed down on the head or cover N of the pipe by the flanges P P, the other flanges Q Q serving for the connection of the pipe D to an ordinary steam-supply or fluid pipe.

The steam or fluid passes through the pipe D in the direction of the arrow and has free passage while the valve A is up and locked, as indicated by the full lines in the drawings; but the instant the bolt G is withdrawn the weight and valve fall to the position shown in dotted lines and effectually and instantly shut off the flow.

My invention is useful for many purposes, but is particularly designed for steamships, in which the passage of steam or working fluid to the engine can be cut off by a person in charge from a position on the bridge or from the cabin in cases of extreme danger and before the engine-room attendant could cause the main shut-off valve to operate.

What I claim, and desire to secure by Letters Patent, is—

The combination with a pipe or passage for a working fluid, a swinging valve arranged therein, and a rocking axle carrying the valve and projecting to the exterior of the pipe or passage, of a lever secured to the projecting end of the axle and having a weight at its outer end constructed with an orifice or recess, a bolt-supporting bracket, a spring-pressed bolt supported by and movable lengthwise in said bracket to engage and disengage the orifice or recess in the weight, a strap attached to the pipe or passage and projecting in proximity to one end of said axle, and an adjustable pivot carried by said strap and pivotally engaging one end of the axle, substantially as described.

In testimony whereof I have hereunto set my hand in presence of two subscribing witnesses.

RALPH JOHN SMITH.

Witnesses:
ALBERT FRANCIS NEWTON,
GEORGE BELL SMITH.